United States Patent
Li et al.

(10) Patent No.: US 6,285,927 B1
(45) Date of Patent: Sep. 4, 2001

(54) SPACECRAFT ATTITUDE DETERMINATION SYSTEM AND METHOD

(75) Inventors: Rongsheng Li, Hacienda Heights; Yeong-Wei Andy Wu, Rancho Palos Verdes, both of CA (US)

(73) Assignee: Hughes Electronics Corporation, El Segundo, CA (US)

( * ) Notice: Subject to any disclaimer, the term of this patent is extended or adjusted under 35 U.S.C. 154(b) by 0 days.

(21) Appl. No.: 09/318,565

(22) Filed: May 26, 1999

(51) Int. Cl.[7] ........................................................ B64G 1/24
(52) U.S. Cl. .............................. 701/13; 244/171; 244/164
(58) Field of Search ..................... 701/4, 13; 244/158 R, 244/164, 165, 171; 342/355, 357.11

(56) References Cited

U.S. PATENT DOCUMENTS

| | | | |
|---|---|---|---|
| 4,658,361 | * 4/1987 | Kosaka et al. | 701/13 |
| 4,679,753 | * 7/1987 | Landecker | 244/171 |
| 4,754,280 | * 6/1988 | Brown et al. | 342/357 |
| 5,109,346 | * 4/1992 | Wertz | 701/226 |
| 5,412,574 | * 5/1995 | Bender et al. | 701/222 |
| 5,546,309 | * 8/1996 | Johnson et al. | 701/13 |
| 5,922,033 | * 7/1999 | Milford et al. | 701/13 |
| 5,948,044 | * 9/1999 | Varley et al. | 701/220 |
| 5,963,166 | * 10/1999 | Kamel | 342/357.01 |

* cited by examiner

*Primary Examiner*—Michael J. Zanelli
*Assistant Examiner*—Eric M Gibson

(57) ABSTRACT

A method and system for minimizing attitude errors resulting from dynamic spacecraft maneuvers or time-varying mismatched attitude sensor measurements. The method includes time-tagging a primary attitude value from a primary attitude sensor and storing the value and associated time stamp in a buffer. A secondary attitude value, generated by a secondary attitude sensor, having a different associated time-stamp is then time-matched to the primary attitude valve. The corrected spacecraft attitude is then calculated as a function of the time-matched primary and secondary attitude values. In one aspect of the invention, the primary attitude sensor generates attitude data at a faster rate than the secondary attitude sensor. This primary attitude data is stored in a buffer such that, when the secondary attitude data becomes available, several nearest-in-time primary attitude data points are retrieved from the buffer. These data points are then used to interpolate a higher time-matched resolution data point. This, in turn, is used along with the secondary attitude data point in updating the spacecraft attitude.

18 Claims, 3 Drawing Sheets

SPACECRAFT ATTITUDE DETERMINATION SYSTEM AND METHOD

TECHNICAL FIELD

The present invention relates to spacecraft attitude determination and, more particularly, to a method and system for minimizing time-mismatch between attitude sensors in spacecraft attitude determination systems.

BACKGROUND ART

Spacecraft attitude determination systems often include more than one attitude sensor. Some examples of typical attitude determination sensors are: 3-axes gyroscopes, star trackers, earth sensors, sun sensors, and beacon sensors. A multi-sensor based attitude determination system uses two or more attitude sensors to construct the spacecraft attitude. Typically, each individual attitude sensor generates attitude data at a moment in time different from the other attitude sensors. This is due to the asynchronous nature of the individual sensors, or to differences between sensor processing delays or data transmission delays. Accordingly, the sensor measurements available to the spacecraft control processor for controlling spacecraft attitude at a particular time, have different associated time moments. If the time mismatch is constant, the attitude error due to time mismatch can be accounted for, and calibrated out of the system. Thus, for example, in an orbit-normal steered spacecraft in a circular orbit, time-mismatched attitude sensor data will result in a constant attitude error which can be calibrated out of the attitude calculations.

The time discrepancy between the attitude measurement sensors can cause significant problems, however, when the spacecraft is experiencing dynamic motions such as agile slew, sun-nadir steering, yaw-flip, and spacecraft orbiting in a highly elliptical orbit (HEO). Time-mismatch of attitude sensor measurements is also a concern for traditional orbit-normal steered spacecraft in a circular orbit, if the time-mismatch is time varying. This will often be the case if the attitude sensors are running on their own clocks, independent from the system clock, and communicating with the spacecraft control processor through an asynchronous data bus.

The issue of time-mismatch between attitude measurement sensors is best illustrated by example. In a satellite having a stellar attitude sensor such as a star tracker and an inertial attitude sensor such a gyroscope, the stellar-inertial attitude determination system has two solutions—the inertial solution and the stellar solution. The inertial solution is obtained by integrating the gyroscope delta angle output, and the stellar solution is obtained by algebraic transformations of the star tracker measurements. Typically, these two solutions are not synchronized, and at any moment, the most recent solutions available to the spacecraft control processor do not match in time. Thus, a time-mismatch exists between the inertially derived attitude integrated from the gyroscope delta angles, and the attitude derived from the star tracker measurements. Thus, for example, if the spacecraft is stewing at 0.3 deg/sec and there is a 0.125 second mismatch between the stellar and inertial measurements, a discrepancy of 135 arcseconds exists. This can lead to inaccurate corrections of the integrated attitude solution. For spacecraft systems which require a few arcsecond or better attitude accuracy, this is not acceptable.

SUMMARY OF THE INVENTION

In the present invention, the aforementioned problems are solved by providing a method of controlling the attitude of a spacecraft by time tagging a primary attitude value from a primary attitude sensor and storing this primary attitude value and associated time stamp in a buffer. A secondary attitude value from a secondary attitude sensor is also generated. Because the secondary attitude value has a different associated time stamp than the primary attitude value, the secondary attitude value is time-matched to the primary attitude value. The corrected spacecraft attitude is then calculated as a function of the time-matched primary and secondary attitude values. The spacecraft attitude is then updated in accordance with the corrected spacecraft values.

In one aspect of the invention, the primary attitude sensor, such as the gyroscope, generates attitude data at a higher frequency than the secondary attitude sensor which may be, for example, a star tracker. The gyroscope data (or the attitude derived from the gyroscope data) is stored in a circular buffer such that when the star measurement becomes available, the star measurement time tag is used to retrieve the nearest-in-time gyroscope data from the buffer. Several gyroscope data points are then used to interpolate a higher time-matched resolution gyroscope data point for use along with the star tracker data point in updating the spacecraft attitude.

Accordingly, an object of the present invention is to provide an improved spacecraft attitude determination method for dynamic space missions or time-varying mismatched attitude sensor measurements.

An advantage of the present invention is stringent attitude determination performance in spacecraft designed for dynamic maneuvers. Another advantage is improved attitude performance for spacecrafts which require very high pointing accuracy.

Other objects and advantages of the invention will become apparent upon reading the following detailed description and appended claims, and upon reference to the accompanying drawings.

BRIEF DESCRIPTION OF THE DRAWINGS

For a more complete understanding of this invention, reference should now be had to the embodiments illustrated in greater detail in the accompanying drawings and described below by way of examples of the invention. In the drawings.

DETAILED DESCRIPTION OF THE INVENTION

Figure 1:
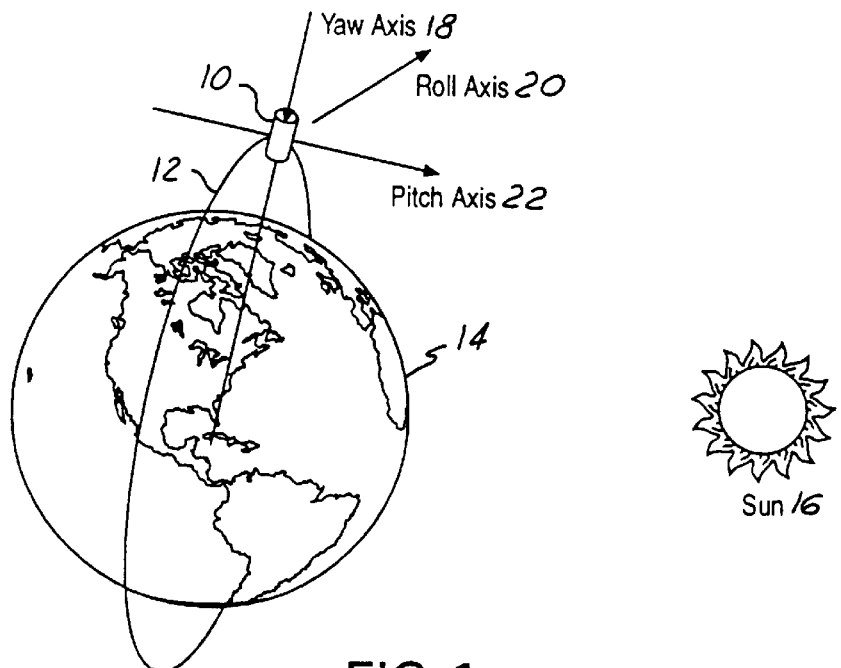
FIG. 1 is a schematic representation of a satellite at an exemplary location relative to the earth and sun.

Referring to FIG. 1, a spacecraft, such as a satellite 10 is shown in orbit 12 around the earth 14. Three mutually orthogonal axes, labeled yard axis 18, roll axis 20, and pitch axis 22, define a spacecraft frame of reference. The yaw axis 18 is coincident with the bore sight of the satellite 10 pointing toward the earth's center. The roll axis 20 is tangential to the orbit 12 in which the satellite 10 travels, and the pitch axis 22 is orthogonal to the plane of the orbit 12.

The illustrated orbit 12 is a sun-synchronous orbit, as is characterized by the line of sight of the satellite 10 to the sun 16 being coincident with the pitch axis 22. Of course, the attitude control method as described herein is not limited to such an orbit and, indeed, is preferably employed in spacecraft programmed to perform dynamic maneuvers.

The satellite 10 includes apparatus (See FIG. 2) for determining its attitude and for correcting its attitude in order to continuously provide accurate pointing. More particularly, attitude refers to the orientation of the satellite 10 with respect three orthogonal reference axes. The sensed attitude represents satellite angular orientation relative to the spacecraft frame of reference defined by the yaw axis 18, the roll axis 20 and the pitch axis 22. It is generally desirable to know the attitude of the satellite 10 with respect to the orbital frame of reference or an inertial frame of reference by means of a direction cosine matrix which embodies the relation between the satellite body frame of reference and the orbital or inertial frame of reference. Thus, as shown in FIG. 1, in the case where the satellite axes 18, 20, 22 are perfectly aligned with the orbital frame of reference, the pitch axis 22 of the satellite 10 experiences the full orbital rate.

Figure 2:
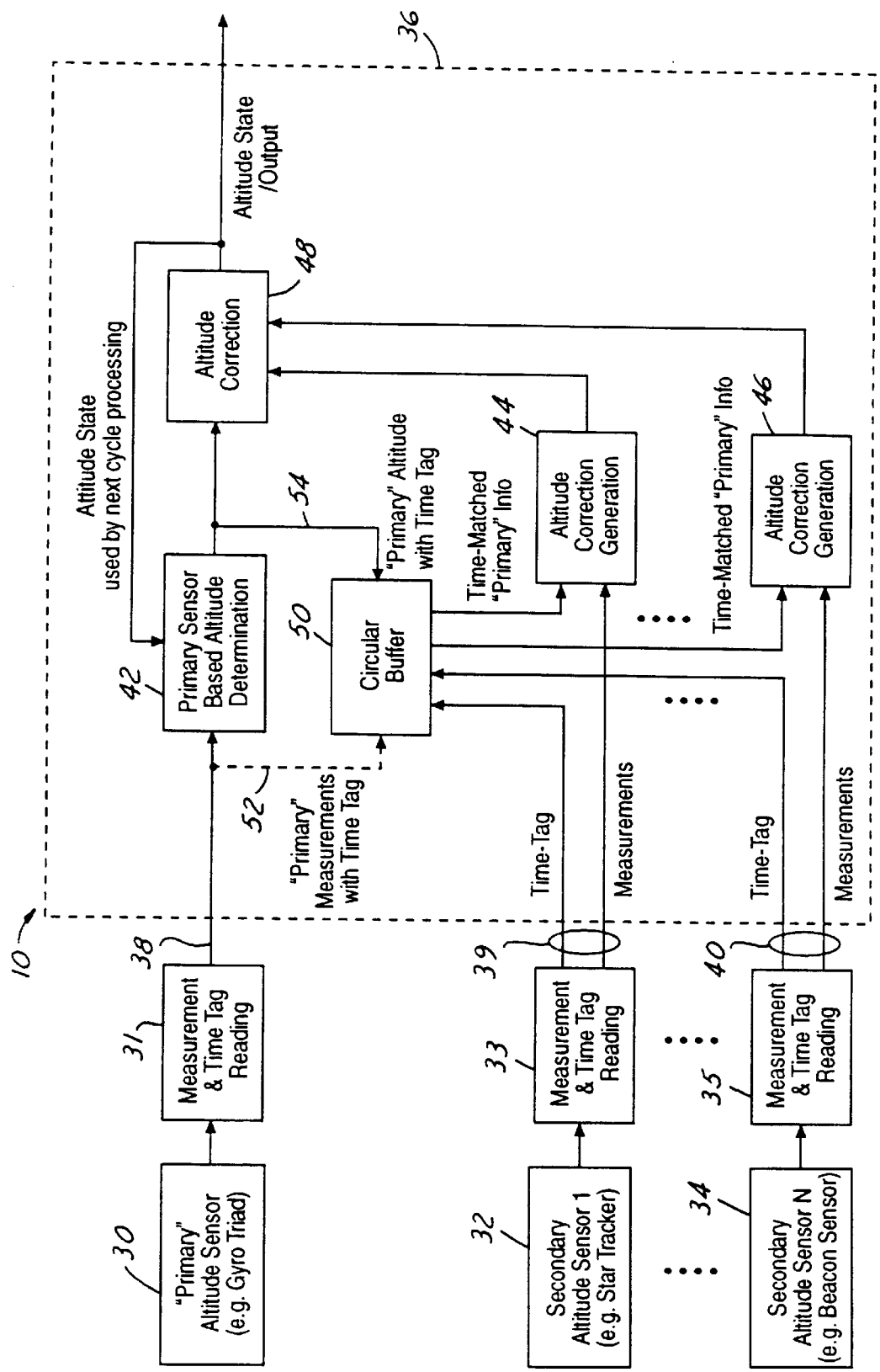
FIG. 2 is a functional block diagram of a spacecraft attitude control system according to one embodiment of the present invention.

FIG. 2 shows, in block diagram form, the primary components of the satellite 10 necessary for attitude processing and control. Satellite 10 includes primary attitude sensor 30 such as a gyroscope (i.e., inertial sensor), one or more secondary sensors 32, 34 such as an earth sensor, a sun sensor, a star tracker, or beacon sensor (i.e., attitude "position" sensors), and a spacecraft control processor 36.

The primary attitude sensor 30 located on the satellite 10 measures rotational rates experienced by the satellite 10 relative to the spacecraft frame of reference. The primary attitude sensor 30 measures the rotational rates of the satellite 10 with respect to the three mutually orthogonal axes 18, 20, 22 and provides the direction cosine matrix computed from the sensed rates.

Similarly, secondary attitude sensors 32 and 34 such sun sensors, earth sensors, star trackers, and/or beacons provide a reference measurement to the respective sensed source.

In this case, the primary and secondary attitude sensors 30, 32, 34 each have an associated clock and processor 31, 33, 35 which communicates with the spacecraft control processor 36 through an asynchronous bus 38, 39, 40, respectively. Accordingly, each of the primary and secondary attitude sensors 30, 32, 34 provide attitude data having an associated time tag to the satellite control processor 36. The time tags allow time matching of the sensor data to calculate attitude corrections for the spacecraft. To accomplish this, the time tag for each sensor measurement must be referenced with respect to the time reference established for the satellite control processor 36. The time tags are made available from the sensor, or can be constructed based on the sensor operations and sensor interface design. The specific implementation for obtaining a time tag, however, is dependent upon the specific sensors used in the satellite control system.

To provide the most reliable time-matched data, the primary sensor 30 is preferably the sensor which outputs information with the least latency and highest output rate. For example, if a gyroscope triad is used in the system, the gyroscope triad would typically be chosen as the primary sensor 30. Thus, as shown in FIG. 2, the primary attitude sensor 30 is used to generate the attitude state/output, and the secondary attitude sensors 32, 34 are used to generate corrections to the attitude state/output.

In general, the spacecraft control processor 36 is responsible for processing the attitude sensor data to update the spacecraft attitude and thereby maintain the satellite 10 in its desired attitude. The spacecraft control processor includes several processors and associated memory operating under the control of a system clock. The primary sensor-based attitude determination is processed in block 42 by known methods such as quaternion integration to produce the attitude state/output of the spacecraft 10. Similarly, attitude correction based upon the secondary sensor attitude data is processed by known methods, such as a Kalman filter, in blocks 44 and 46. Spacecraft attitude correction is processed in block 48 by known methods as a function of the output of blocks 42, 44, and 46. This output is then used to update the spacecraft attitude.

The spacecraft control processor 36 further includes a buffer 50, which is preferably a circular, or FIFO, buffer. The buffer 50 stores attitude information derived from the primary attitude sensor which is received along signal line 54. Alternatively, the buffer 50 can store the primary attitude sensor measurements received along signal line 52. This information is stored together with a time tag associated with the measurement data or the attitude data derived from the primary attitude sensor measurement. For optimum performance, the primary attitude sensor data is stored in the buffer 50 at the maximum possible rate. In the case of a circular buffer, the amount of memory storage should be sufficient to provide data for the maximum delay associated with the secondary attitude sensors 32, 34.

In operation, before the data associated with the secondary attitude sensors 32, 34 can be used to correct the spacecraft attitude in blocks 44, 46 and 48, it must be time-matched to the primary attitude sensor data which is being output at a higher rate. This is accomplished by using the time-tag of the secondary attitude sensor data to look up two or more data values stored in the circular buffer 50 having a time-tag closest in time to the time-tag of the secondary attitude sensor data being used. These retrieved data points are then used to construct a time-matched data point by, for example, interpolation. The time-matched primary attitude sensor data is then used together with the secondary attitude sensor data as shown in blocks 44 and 46 to compute the attitude correction using, for example, Kalman filters. This time-matched attitude correction data is then used to correct the primary attitude state as shown in block 48.

Figure 3:
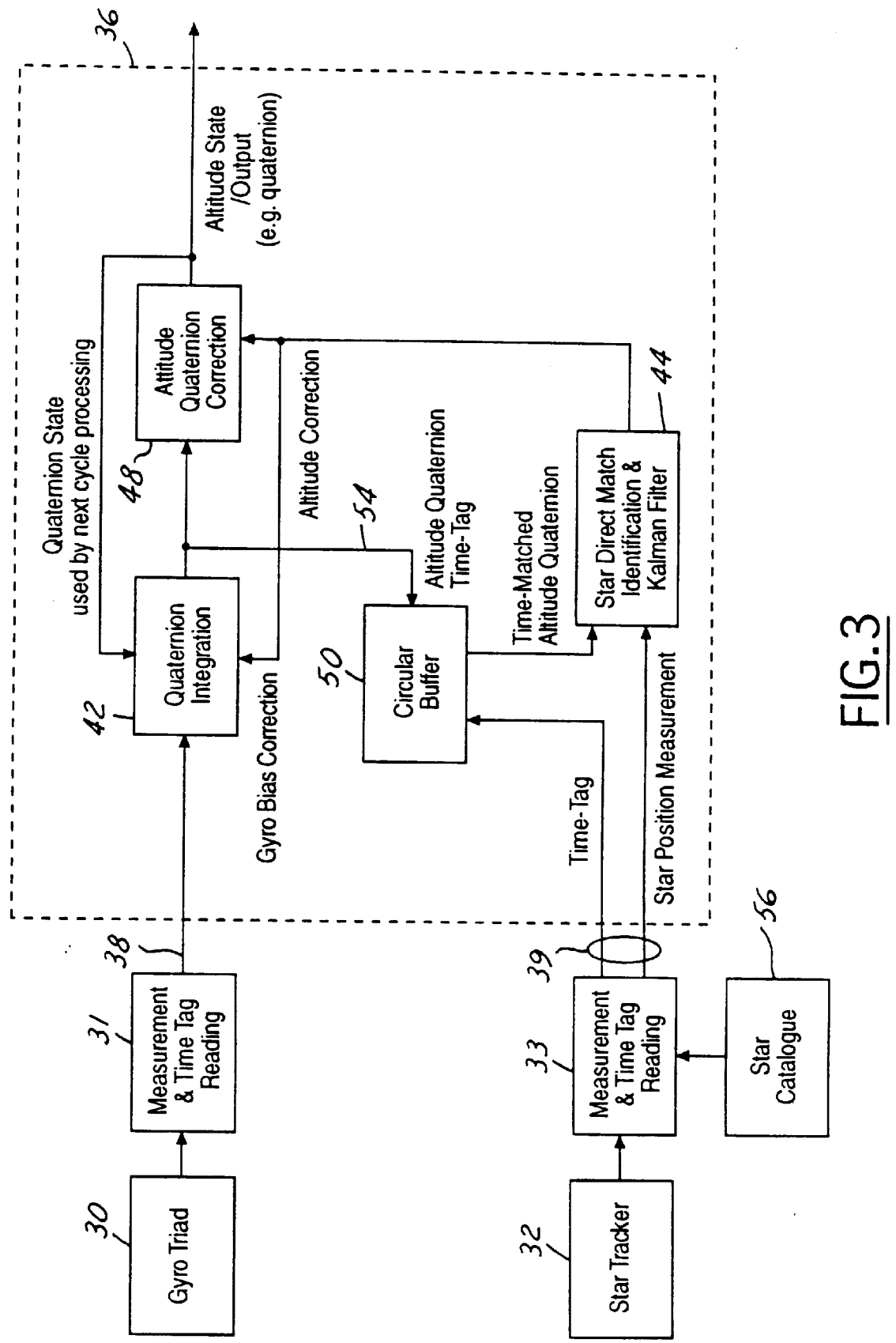
FIG. 3 is a functional block diagram of another embodiment of a spacecraft attitude control system according to the present invention.

Referring to FIG. 3, there is shown another embodiment of an spacecraft attitude control system according to the present invention. For simplicity, components corresponding to those described with reference to FIG. 2 are given the same reference numeral. For illustrative purposes, however, FIG. 3 is an exemplary specific implementation of the present attitude control system. As shown in FIG. 3, the primary attitude sensor 30 is a gyro triad and only one secondary attitude sensor 32 is provided—a star tracker having an associated star catalog 56. In this case, the primary attitude sensor 30 is a three-axis gyroscope that outputs the three-axis delta angles at, for example, 30 Hz. The delta angles together with their associated time-tags are received by the software module 42 which performs quaternion integration at 30 Hz. The quaternion, as a mathematical representation of the spacecraft attitude, together with the time-tag is stored into the circular buffer 50 along signal line 54 at a rate of 30 Hz.

Figure 4:
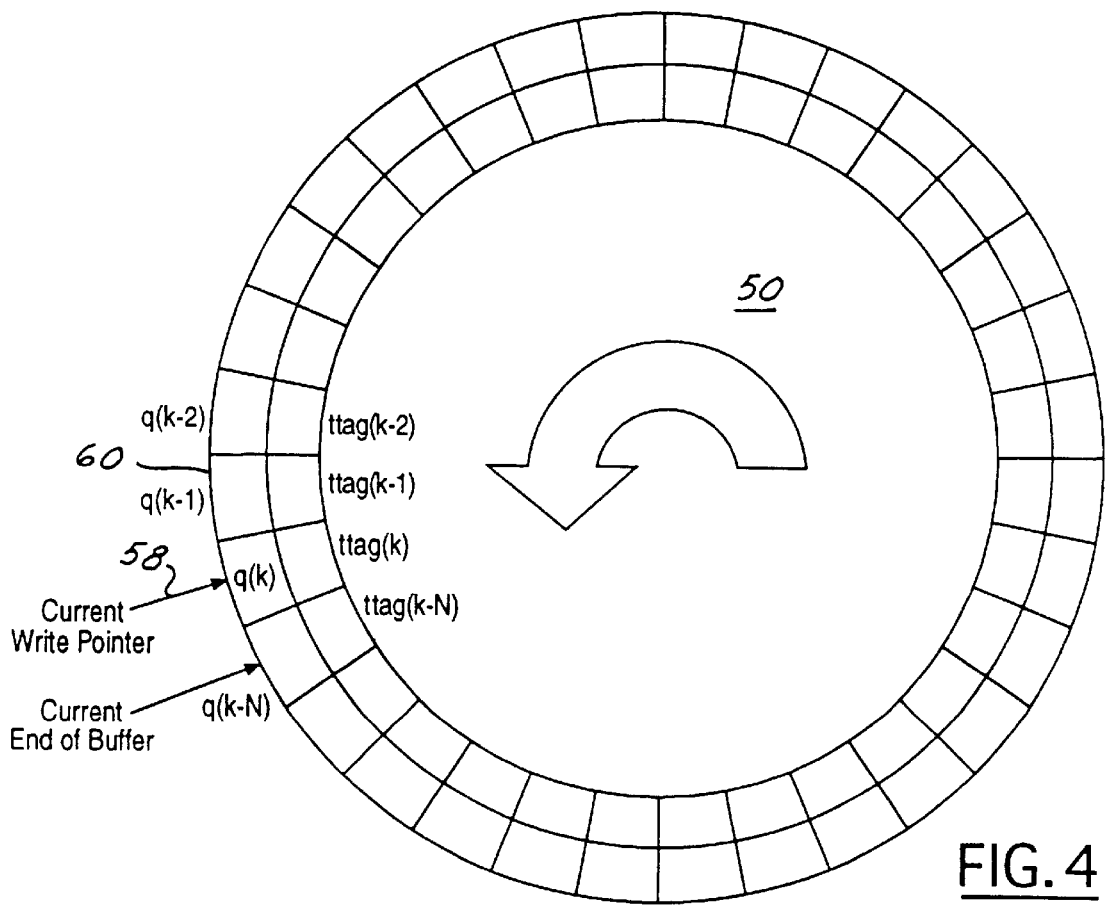
FIG. 4 is a schematic block diagram of a circular buffer for use in connection with the attitude control system of FIG. 3.

FIG. 4 shows one embodiment of the circular buffer 50 of FIG. 3. In this case, the quaternion output, together with its time tag, is stored into the buffer location as pointed to by the current write pointer 58. Once this occurs, the write pointer 58 is indexed to the next data slot 60. In FIG. 4, q(k) and ttag(k) represent the quaternion and the time-tag, respectively, produced by the quaternion integration algorithm (block 42 of FIG. 3) for the current moment. As can be seen, the buffer 50 contains the quaternion and the associated time-tag at time k, k-1, k-2, . . . , k-N. The data point k-1 corresponds to the previous time frame which, in this example, is 1/30 seconds earlier than the current time frame, and k-2 represents the data point before k-1 which is 1/30 seconds earlier than k-1, and so on. N represents the length of the buffer 50. Preferably, N is sized large enough to store data up to the maximum time-mismatch between the star tracker data and gyro data.

Referring again to FIG. 3, once the star measurement is complete in block 33, the time-tag associated with star tracker measurement is then used to retrieve two quaternions in the buffer 50 having time-tags closest in time to the star measurement time-tag. If the star measurement time tag is defined as st_ttag, and the indices associated with the two quaternions are given by j and j1, a time-matched quaternion for the current star measurement can be calculated by interpolating as follows:

$$dq(j1,j) = q^{-1}(j) \otimes q(j1) \quad (1)$$

$$Fract = (st\_ttag(j))/(ttag(j1) - ttag(j)) \quad (2)$$

$$q(st\_ttag) = q(j) \otimes \begin{pmatrix} (Fract)dq(j1, j) \\ 1 - (Fract)^2(1 - dq_4(j1, j)) \end{pmatrix} \quad (3)$$

where the time-matched quaternion for time st_ttag is given by q(st_ttag).

Given the time-matched quaternion and the star measurements, the attitude and gyro bias corrections can be computed using known methods of direct-match star identification and Kalman filter techniques as shown in block 44. These corrections are then applied to the gyroscope data and attitude quaternion in block 48 before the quaternion integration in block 42 executes its next iteration.

From the foregoing, it can be seen that there has been brought to the art a new and improved attitude control system and method which minimizes attitude errors resulting from dynamic spacecraft maneuvers or time-varying mismatched attitude sensor measurements. While the invention has been described in connection with one or more embodiments, it will be understood that the invention is not limited to those embodiments. In particular, the disclosed attitude determination system and method as shown in FIG. 3 can be readily applied to a multi-sensor based attitude determination system including more than one secondary attitude sensor. Accordingly, it is intended that the invention include all alternatives, modifications, and equivalents, as may be included within the spirit and scope of the appended claims.

What is claimed is:

1. A method of controlling the attitude of a spacecraft comprising the steps of:
   generating primary attitude values from a primary attitude sensor, each of said primary attitude values having an associated time stamp;
   storing said primary attitude values and associated time stamps in a buffer;
   generating a secondary attitude value from a secondary attitude sensor, said secondary attitude value having an associated time stamp;
   storing said secondary attitude value and associated time stamp in said buffer;
   time-matching said secondary attitude value and said primary attitude values;
   computing corrected spacecraft attitude values as a function of said time-matched primary and secondary attitude values; and
   updating the attitude of said spacecraft in a manner directly related to the corrected spacecraft attitude values.

2. The method as set forth in claim 1 wherein the step of generating primary attitude values from a primary attitude sensor includes the step of determining a desired spacecraft attitude using quaternion integration as a function of said primary attitude values, said desired spacecraft attitude having an associated time stamp, said desired spacecraft attitude and associated time stamp being stored in said buffer.

3. The method as set forth in claim 1 wherein the step of time-matching said secondary attitude value and said primary attitude values includes the step of retrieving from said buffer at least two primary attitude values closest in time to said secondary attitude value.

4. The method as set forth in claim 3 wherein the step of time-matching said secondary attitude value and said primary attitude values includes the step of interpolating between said at least two primary attitude values to estimate a primary attitude value having an equivalent time stamp as said secondary attitude value.

5. The method as set forth in claim 1 wherein the step of storing said primary attitude values and associated time stamps in a buffer includes the step of writing said primary attitude values and associated time stamps to a circular buffer.

6. The method as set forth in claim 5 wherein the length of said circular buffer is defined by the time associated with generating said secondary attitude value.

7. An attitude control system for a spacecraft comprising:
   a primary attitude sensor providing primary attitude values at a first rate, each of said primary attitude values having an associated time stamp;
   a secondary attitude sensor providing secondary attitude values at a second rate, each of said secondary attitude values having an associated time stamp, said secondary attitude values being output vectors to a detected source;
   a buffer for storing at least said primary attitude values and associated time stamps; and
   a spacecraft control processor for time-matching said primary and secondary attitude values, said time-matched primary and secondary attitude values being used to correct the attitude of said spacecraft.

8. The attitude control system of claim 7 wherein said primary attitude sensor is an inertial measurement unit.

9. The attitude control system of claim 7 wherein said buffer is a circular buffer.

10. The attitude control system of claim 9 wherein said circular buffer length is directly related to said second rate.

11. The attitude control system of claim 7 wherein said spacecraft control processor further includes a Kalman filter for receiving said time-matched primary and secondary attitude values and generating corrected attitude values.

12. The attitude control system of claim 7 further comprising a plurality of secondary attitude sensors wherein each of said secondary attitude sensors provides secondary attitude values at an associated rate and each of said secondary attitude values have an associated time stamp.

13. In a spacecraft having an inertial attitude sensor operating on a first clock cycle, a stellar attitude sensor operating on a second clock cycle, a spacecraft control processor operating on a system clock, and a buffer, a method of controlling the attitude of said spacecraft comprising the steps of:

generating primary attitude values from said inertial attitude sensor, each of said primary attitude values having an associated time stamp referenced to said system clock;

storing said primary attitude values and associated time stamps in said buffer;

generating a secondary attitude value from said stellar attitude sensor, said secondary attitude value having an associated time stamp referenced to said system clock;

computing a corrected primary attitude value having the same time reference as said secondary attitude value;

computing corrected spacecraft attitude values as a function of said time-matched primary and secondary attitude values; and updating the attitude of said spacecraft in a manner directly related to the corrected spacecraft attitude values.

14. The method as set forth in claim 13 wherein the step of generating primary attitude values from said inertial attitude sensor includes the step of determining a desired spacecraft attitude using quaternion integration as a function of said primary attitude values.

15. The method as set forth in claim 14 wherein the step of computing a corrected primary attitude value having the same time reference as said secondary attitude value includes the step of interpolating between said at least two primary attitude values to estimate a primary attitude value having an equivalent time stamp as said secondary attitude value.

16. The method as set forth in claim 14 wherein the step of computing corrected spacecraft attitude values as a function of said time-matched primary and secondary attitude values includes the step of computing corrected spacecraft values using a Kalman filter.

17. The method as set forth in claim 13 wherein the step of computing a corrected primary attitude value having the same time reference as said secondary attitude value includes the step of retrieving from said buffer at least two primary attitude values closest in time to said secondary attitude value.

18. The method as set forth in claim 13 wherein the step of storing said primary attitude values and associated time stamps in said buffer includes the step of writing said primary attitude values and associated time stamps to a circular buffer.

* * * * *